(12) United States Patent
Sinclair

(10) Patent No.: US 11,891,319 B2
(45) Date of Patent: Feb. 6, 2024

(54) WASTEWATER TREATMENT PLANT AND RELATED METHOD WITH BIOLOGICAL TREATMENT PROCESS AND HEAT TRANSFER MEANS

(71) Applicant: Robert Sinclair, Winnipeg (CA)

(72) Inventor: Robert Sinclair, Winnipeg (CA)

( * ) Notice: Subject to any disclaimer, the term of this patent is extended or adjusted under 35 U.S.C. 154(b) by 0 days.

(21) Appl. No.: 17/734,402

(22) Filed: May 2, 2022

(65) Prior Publication Data

US 2022/0356092 A1    Nov. 10, 2022

Related U.S. Application Data

(60) Provisional application No. 63/184,287, filed on May 5, 2021.

(51) Int. Cl.
| | |
|---|---|
| *C02F 3/00* | (2023.01) |
| *C02F 3/30* | (2023.01) |
| *C02F 1/00* | (2023.01) |
| *C02F 3/12* | (2023.01) |
| *C02F 101/16* | (2006.01) |
| *C02F 101/30* | (2006.01) |

(52) U.S. Cl.
CPC .............. *C02F 3/006* (2013.01); *C02F 1/006* (2013.01); *C02F 3/1221* (2013.01); *C02F 3/305* (2013.01); *C02F 2101/16* (2013.01); *C02F 2101/30* (2013.01); *C02F 2203/006* (2013.01); *C02F 2303/18* (2013.01)

(58) Field of Classification Search
CPC ........ C02F 3/006; C02F 1/006; C02F 3/1221; C02F 3/305; C02F 2101/16; C02F 2101/30; C02F 2203/006; C02F 2303/18; C02F 2101/32; Y02W 10/10
USPC ....................................................... 210/607
See application file for complete search history.

(56) References Cited

U.S. PATENT DOCUMENTS

| | | | |
|---|---|---|---|
| 9,719,704 B2* | 8/2017 | Giraldo | C02F 9/00 |
| 2012/0168373 A1* | 7/2012 | Del Porto | C02F 3/1257 |
| | | | 210/603 |
| 2017/0283288 A1* | 10/2017 | Chaffee | C02F 3/08 |

FOREIGN PATENT DOCUMENTS

| | | | | |
|---|---|---|---|---|
| JP | H06347183 A | * | 12/1994 | ............ Y02W 10/10 |
| WO | WO-0136338 A1 | * | 5/2001 | ................ C02F 1/72 |

OTHER PUBLICATIONS

Translation of Koseki (JP_H06347183) (Year: 1994).*

* cited by examiner

*Primary Examiner* — Ekandra S. Miller-Cruz
(74) *Attorney, Agent, or Firm* — Christopher J. Dynowski; Michael R. Williams; Ade & Company Inc.

(57) ABSTRACT

A wastewater treatment plant and related method comprise a treatment stage including a biological-process substage configured for growing unicellular organisms adapted to reduce contaminants in the wastewater which are dissolved, including at least one of organic matter and nitrogenous matter, by digestion thereof, and which are adapted to floc after digestion and a floc-removal substage downstream from the biological-process substage, relative to the flow of wastewater, and configured for substantially removing the unicellular organisms that have flocked. The treatment stage is configured to form majority and minority flows of treated wastewater, and the minority flow is configured to be recycled upstream of the biological-process treatment substage. The plant includes a heat transfer assembly configured for transferring heat from the majority flow of treated wastewater to the minority flow thereof to increase temperature of wastewater to be treated.

10 Claims, 1 Drawing Sheet

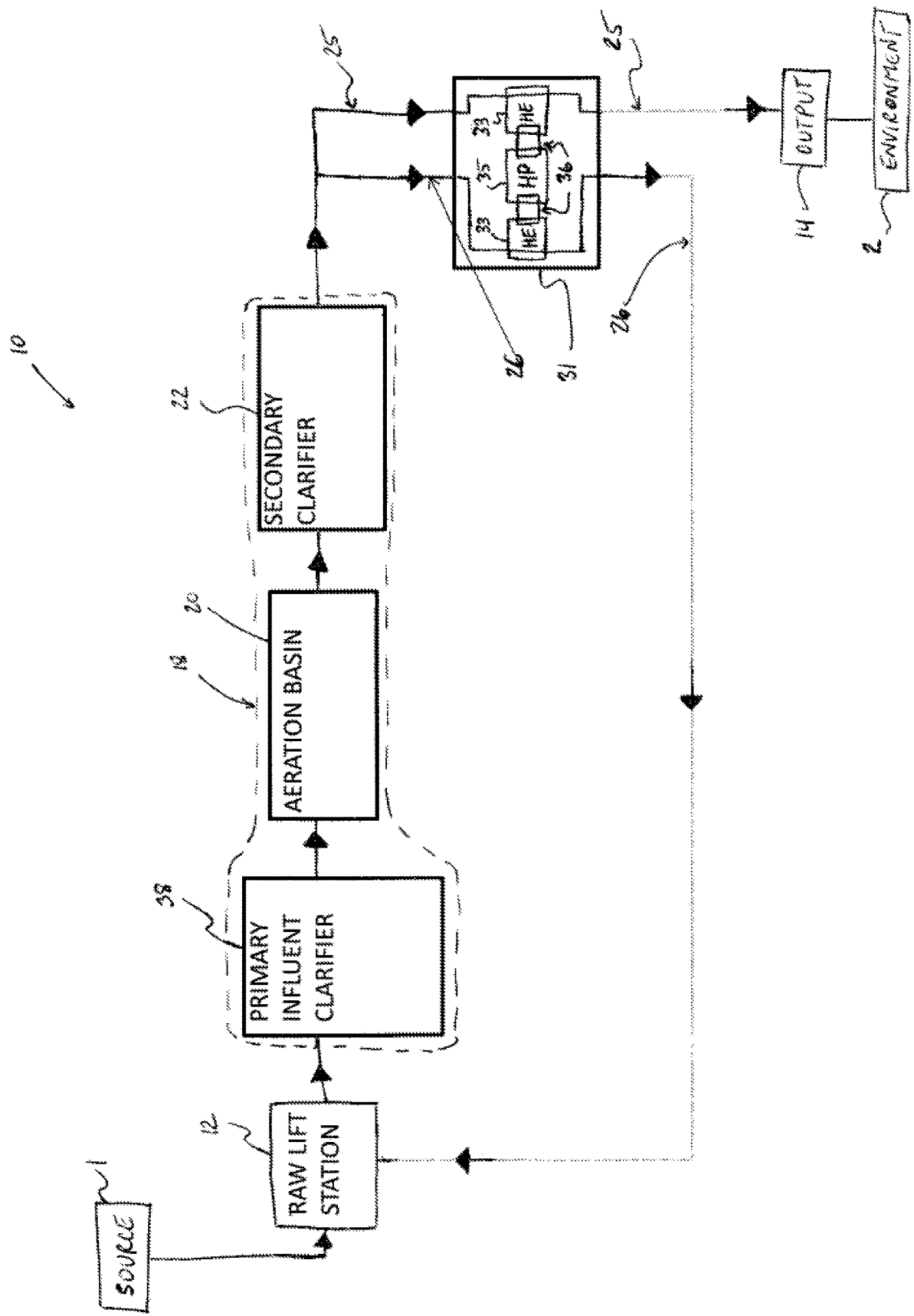

WASTEWATER TREATMENT PLANT AND RELATED METHOD WITH BIOLOGICAL TREATMENT PROCESS AND HEAT TRANSFER MEANS

This application claims the benefit under 35 U.S.C. 119(e) of U.S. Provisional Application Ser. No. 63/184,287 filed May 5, 2021.

FIELD OF THE INVENTION

The present invention relates generally to a wastewater treatment plant or facility and related wastewater treatment method, and more particularly to such a plant or facility having heat recycling means to transfer heat from one location or stage in a treatment process to another location or stage to improve the treatment process, and related method of wastewater treatment.

BACKGROUND

Wastewater treatment becomes challenging in cold climates due to a temperature of influent water to a treatment plant. Most processes performed in such a facility are temperature dependent on the water passing therethrough. Thus, when the wastewater to be treated is of a relatively low temperature, increased viscosity of cold wastewater slows settling and slows the microbiologic enzyme reactions of aerobic treatment processes.

SUMMARY OF THE INVENTION

According to an aspect of the invention there is provided a wastewater treatment plant comprising:
- an input configured for receiving wastewater for treatment;
- an output configured for discharging wastewater after treatment;
- wherein a flow of wastewater is defined by the input and the output;
- a treatment stage between the input and the output and configured for reducing contaminants in the wastewater to form treated wastewater substantially free of the contaminants;
- wherein the treatment stage includes:
  - a biological-process substage configured for growing unicellular organisms adapted to reduce contaminants in the wastewater which are dissolved, including at least one of organic matter and nitrogenous matter, by digestion thereof, and which are adapted to floc after digestion;
  - a floc-removal substage downstream from the biological-process substage, relative to the flow of wastewater, and configured for substantially removing the unicellular organisms that have flocked;
- wherein the treatment stage is further configured to form, downstream of the floc-removal substage, majority and minority flows of treated wastewater respectively comprising majority and minority volumes thereof;
- wherein the minority flow of treated wastewater is configured to be recycled upstream of the biological-process substage of the treatment stage; and
- a heat transfer assembly configured for transferring heat from the majority flow of treated wastewater to the minority flow of treated wastewater to increase temperature of wastewater to be treated.

This arrangement uses a portion of treated wastewater which is suited for discharge to the environment, so as to be returned to same, as a heat transport vehicle to increase temperature of wastewater for treatment, which acts to improve treatment processes. Importantly, activated sludge treatment efficiency increases by 200% for each 18° F. (10° C.) rise of temperature. A temperature increase of 36° F. may therefore increase treatment efficiency 400%. The treated wastewater is substantially free of contaminants, particularly undissolved solids, and thus is better suited for passing through a heat transfer device such as a heat exchanger.

Preferably, the heat transfer assembly comprises a pair of heat exchangers with an intervening heat pump operatively coupled between each one of the pair of heat exchangers so that heat is transferred from the majority flow of treated wastewater to heat transfer fluid, and therefrom to the minority flow of treated wastewater.

In one arrangement, the majority flow comprises between about 70% and about 95% of the treated wastewater and the minority flow comprises between about 5% and about 30% of the treated wastewater.

In another arrangement, the majority flow comprises between about 85% and about 90% of the treated wastewater and the minority flow comprises between about 10% and about 15% of the treated wastewater.

Preferably, the treatment stage further includes a solids-removal substage configured for reducing contaminants in the wastewater which are undissolved solids. Typically, the solids-removal substage is upstream from the biological-process substage, and preferably the minority flow of treated wastewater is recycled upstream of the solids-removal substage.

Preferably, the solids-removal substage is configured to reduce the contaminants in the wastewater which are undissolved solids by gravitational separation. Thus, by increasing temperature, the wastewater becomes less viscous such that settling by gravity occurs more quickly.

Preferably, the floc-removal substage is configured for substantially removing the unicellular organisms that have flocked by gravitational separation. Similarly, by increasing temperature, the wastewater is less viscous or dense such that settling by gravity occurs more quickly and efficiently.

Typically, the biological-process substage comprises an aeration tank or basin configured to aerate wastewater therein.

Typically, the floc-removal substage comprises a clarifier.
Typically, the solids-removal substage comprises a clarifier.

According to another aspect of the invention there is provided a method for treating wastewater comprising:
- applying a biological process to reduce dissolved contaminants in the wastewater including at least one of organic matter and nitrogenous matter, wherein the biological process comprises growing unicellular organisms adapted to digest the dissolved contaminants;
- after applying the biological process, substantially removing the unicellular organisms from the wastewater;
- substantially removing undissolved solid contaminants from the wastewater;
- whereby treated wastewater is formed;
- forming majority and minority flows of the treated wastewater respectively comprising majority and minority volumes thereof;
- transferring heat from the majority flow to the minority flow;

mixing the heated minority flow of treated wastewater with wastewater before applying the biological process to increase temperature of wastewater for treatment; and after transferring heat from the majority flow to the minority flow, discharging the majority flow of treated wastewater.

Typically, substantially removing undissolved solid contaminants from the wastewater is performed before applying the biological process, and preferably the heated minority flow of treated wastewater is mixed with the wastewater before substantially removing the undissolved solid contaminants.

Typically, substantially removing undissolved solid contaminants from the wastewater comprises gravitationally separating the undissolved solid contaminants.

Typically, substantially removing the unicellular organisms from the wastewater comprises gravitationally separating the unicellular organisms.

Preferably, transferring heat from the majority flow to the minority flow comprises transferring heat from the majority flow to an intermediate heat transfer fluid and transferring heat from the intermediate heat transfer fluid to the minority flow.

Typically, the majority flow of treated wastewater is discharged to the environment, usually to surface water.

BRIEF DESCRIPTION OF THE DRAWINGS

The invention will now be described in conjunction with the accompanying drawings in which:

FIG. 1 is a schematic diagram of an arrangement of wastewater treatment plant according to the present invention.

In the drawings like characters of reference indicate corresponding parts in the different FIGURES.

DETAILED DESCRIPTION

In the accompanying FIGURES there is shown a wastewater treatment plant 10 for treating wastewater. The wastewater treated by the plant 10 is received from a source 1 commonly formed by a network of water-consuming entities for example residential dwellings and/or industrial buildings, which are fluidically coupled to the plant by subterranean piping. The wastewater comprises water applied by entities forming the source 1 for various processes such as personal hygiene, sanitation (for example, dish washing) or industrial or manufacturing processes, and contaminants carried by the used water including undissolved solids, dissolved (solid) organic or carbonaceous matter and dissolved (solid) nitrogenous matter, which are toxic, unhygienic or otherwise undesirable. Untreated, this organic matter if discharged to surface water would consume oxygen in the water body potentially starving mainly native fish species in the water of oxygen often resulting in fish kills.

The plant 10 comprises an input 12 configured for receiving wastewater for treatment, such as by fluidic coupling to the source 1, and an output 14 configured for discharging wastewater after treatment, such as by draining to environment, such that treated wastewater, which is basically sanitized fresh water, is returned to a natural water system. The input and output 12, 14 define a flow of water through the plant in a direction from the input 12 to the output 14 which is indicated by directional arrows in FIG. 1. The wastewater received into the plant 10 may be termed in industry as raw inflow and that discharged from the plant 10 may be termed as treated outflow.

In the illustrated arrangement, the input 12 comprises a wet well, which may be termed in industry as a raw lift station, which basically is a container located outside and configured for collecting wastewater to be treated.

The plant 10 further comprises a treatment stage 18 between the input 12 and the output 14, which is configured for reducing contaminants in the wastewater to form treated wastewater substantially free of the contaminants. The treatment stage 18 is in fluidic communication with the wet well 12 downstream thereof to receive the raw inflow.

The treatment stage 18 includes two or more distinct substages which employ different treatment process to the wastewater to reduce the contaminants therein. In the illustrated arrangement, the treatment stage 18 is of an 'activated sludge' type which generally comprises a biological-process substage 20 configured for growing unicellular organisms, typically bacteria and protozoa, adapted to reduce contaminants in the wastewater which are dissolved, including at least one of organic matter and nitrogenous matter, by digestion thereof. In other words, the unicellular microorganisms are adapted to decompose the contaminants by consuming same as a food source. Consumption of the contaminants results in more microorganisms. Also, the unicellular organisms which are adapted to floc after digestion, that is to clump together. In industry, these flocking unicellular organisms may be referred to as activated sludge.

In the illustrated arrangement, the biological-process substage 20 comprises an aeration tank or basin configured to aerate wastewater therein. Compressed air, a portion of which is oxygen, is admitted to the tank to both mix and promote growth of the unicellular organisms therein, which are aerobic. Thus, the treatment process which takes place at this substage may be alternatively referred to as biological oxidation, and digestion of contaminants may be referred to as enzyme oxidation.

Thus, at the biological-process substage 20, unicellular organisms are introduced into the flow of wastewater and growth thereof is promoted, so that dissolved solid contaminants are removed thereby from the wastewater.

In other words, the biological-process treatment substage 20 is adapted for aerobic microbiological degradation or decomposition of dissolved solid contaminants.

Furthermore, the activated sludge-based treatment stage 18 includes a floc-removal substage 22 downstream from the biological-process substage 20, relative to the flow of wastewater indicated by the directional arrows in FIG. 1, and configured for substantially removing the unicellular organisms that have flocked. That is, this substage 22 is configured to separate from the wastewater the organisms which have clumped together after oxidizing and digesting dissolved contaminants.

In the illustrated arrangement, the floc-removal substage 22 comprises a clarifier such that the floc-removal substage is configured for substantially removing the unicellular organisms, which have flocked, by gravitational separation, which is a physical treatment process.

Downstream of the foregoing treatment substages 20 and 22, the treatment stage 18 is configured to form or produce majority and minority flows 25, 26 of treated wastewater respectively comprising majority and minority volumes thereof. In other words, from the treatment stage 18 there are discharged two distinct streams of a common substance which is the treated wastewater, where one stream comprises a majority volume of the treated wastewater, meaning more than half the volume of treated wastewater (greater than 50%), and the other stream comprises the remaining minority flow of the treated wastewater, meaning less than half the volume of treated wastewater (less than 50%). According to a broader operational range, the majority flow comprises between about 70% and about 95% of the treated wastewater, and the minority flow comprises between about 5% and about 30% of the treated wastewater. According to a narrower operational range, the majority flow comprises between about 85% and about 90% of the treated wastewater, and the minority flow comprises between about 10% and about 15% of the treated wastewater.

Typically, in an activated sludge based treatment stage, the floc-removal substage 22 is the final treatment substage yielding the completely treated wastewater. Thus, by the end of the biological-process substage, the wastewater is generally substantially treated such that all contaminants have been removed except now the wastewater contains unicellular organisms, and on this basis the wastewater is still contaminated. Since the floc-removal substage of the illustrated arrangement operates by gravitational separation, it may also be used to remove undissolved solid contaminants in the wastewater.

Treated wastewater is eventually delivered to the output 14 for discharge to the environment 2, such as to surface water. However, not all of the treated wastewater is discharged, as the minority flow 26 of the treated wastewater is recycled to an upstream location within the plant for mixing with wastewater to be treated.

In conjunction with the recycling of the minority treated flow, the plant 10 includes a heat transfer assembly 31 configured for transferring heat which is extracted from the majority treated flow 25 and input to the minority treated flow 26. Thus, when the minority treated flow is mixed with upstream, at least partially untreated wastewater, this acts to increase temperature thereof (meaning more heat) which enhances downstream treatment processes.

In the illustrated arrangement, the heat transfer assembly 31 comprises a pair of heat exchangers 33 each operatively coupled to an intervening heat pump 35 by a heat transfer loop 36 configured to circulate a heat-transfer fluid between the respective one of the heat exchangers and the common heat pump. This assembly is thus configured to transfer heat from the majority flow 25 of treated wastewater to circulating heat-transfer fluid in a first heat transfer loop via a first one of the heat exchangers, from which the heat pump 35 transfers heat to circulating heat transfer fluid in a second heat transfer loop, from which heat is transferred to the minority flow 26 of treated wastewater via a second one of the heat exchangers. This is the only assembly or grouping of heat transfer devices provided in the plant 10 to recover heat of treated outflow that would normally be discharged to the environment.

Also in the illustrated arrangement, the treatment stage 18 further includes a solids-removal substage 38 configured for reducing contaminants in the wastewater which are undissolved solids. Typically, the solids-removal substage is upstream from the biological-process substage, and the minority flow of treated wastewater is recycled upstream of the solids-removal substage 38. In the illustrated arrangement, the minority heated and treated flow 26 is mixed with raw untreated wastewater at the wet well 12.

In the illustrated arrangement, the solids-removal substage 38 comprises a clarifier so as to be configured to reduce the contaminants in the wastewater which are undissolved solids by gravitational separation. Thus, as there are two clarifiers in the illustrated arrangement, the one which acts primarily to remove undissolved solids is termed the primary clarifier and the one downstream which acts primarily to removed flocked microorganisms is termed the secondary clarifier.

Also in the illustrated arrangement, the solids-removal substage 38 is a first substage of the overall treatment stage 18, which is preliminary to the biological-process substage so as to come before same, and which yields partially treated wastewater suitable for further treatment by downstream processes.

In other words, the illustrated arrangement of wastewater treatment plant comprises a physical gravity settling substage to remove the largest solids passing an initial physical screening.

Thus, by increasing temperature, the wastewater becomes less viscous such that settling by gravity occurs more quickly and efficiently. This is applicable to both the solids-removal substage 38 and the floc-removal substage 22 when they operate by gravitational separation or sedimentation.

The foregoing arrangement of wastewater treatment plant uses a portion of treated wastewater which is suited for discharge to the environment as a heat transport vehicle to increase temperature of wastewater for treatment, which acts to improve treatment processes. The treated wastewater is substantially free of contaminants, particularly undissolved solids, and thus is better suited for passing through a heat transfer device such as a heat exchanger.

It will be appreciated that a 18° F. (10° C.) increase in temperature results in a doubling (200% increase) of the microbiologic treatment rate and 36° F. (20° C.) will further increase the treatment rate by quadrupling (400% increase) the microbiologic treatment rate. This is the very significant result of raising process temperatures while improved gravity settling is also an important benefit.

Furthermore, as described hereinbefore, there is provided a method for treating wastewater generally comprising the following steps:
  applying a biological process to reduce dissolved contaminants in the wastewater including at least one of organic matter and nitrogenous matter, wherein the biological process comprises growing unicellular organisms (activated sludge) adapted to digest the dissolved contaminants, which is performed at 20;
  after applying the biological process, substantially removing the unicellular organisms from the wastewater, which is performed at 22;
  substantially removing undissolved solid contaminants from the wastewater, which is performed at 38;
  whereby treated wastewater is formed;
  forming majority and minority flows of the treated wastewater at 25 and 26 respectively comprising majority and minority volumes thereof;
  transferring heat from the majority flow to the minority flow, which is performed at 31;
  mixing the heated minority flow of treated wastewater with wastewater before applying the biological process to increase temperature of wastewater for treatment, which in the illustrated arrangement is performed at 12; and
  after transferring heat from the majority flow to the minority flow, discharging the majority flow of treated water, which takes place at 14.

Of course, prior to any of the foregoing steps, there is a step of receiving wastewater to be treated, which occurs at the input 12.

In the illustrated arrangement, the step of substantially removing undissolved solid contaminants from the wastewater at 38 is performed before applying the biological process, and the heated minority flow of treated wastewater 25 is mixed with the wastewater before substantially removing the undissolved solid contaminants, so at the input 12 in the illustrated arrangement.

In the illustrated arrangement, the step of substantially removing undissolved solid contaminants from the wastewater at 38 comprises gravitationally separating the undissolved solid contaminants. The undissolved contaminants settle to the bottom of the primary clarifier. Typically, a scraper system is provided to remove the gravity settled solids from 38, the primary influent clarifier to storage tanks.

In the illustrated arrangement, the step of substantially removing the unicellular organisms from the wastewater at 22 comprises gravitationally separating the unicellular organisms, namely, activated sludge. Typically, the settled activated sludge is removed by scrapers to storage tanks and from the storage tanks, a small flow of settled activated sludge is returned to the aeration basin, 20.

In the illustrated arrangement, the step of transferring heat from the majority flow to the minority flow at 31 comprises transferring heat from the majority flow to an intermediate heat transfer fluid and transferring heat from the intermediate heat transfer fluid to the minority flow.

Generally speaking, a temperature of the minority treated flow 26 is augmented as much as possible, for example to about 75-80 degrees Celsius by the heat extracted from the majority treated flow which accordingly reduces temperature of discharged treated wastewater to 3-5 degrees Celsius. A temperature of the wastewater at the input may be about 6 to 10 degrees Celsius during the colder seasons, and once mixed with the heated treated flow the wastewater passing through the treatment stage may gradually warm to about 20 to 28 degrees Celsius.

Thus, by reducing a portion of completely raw or untreated wastewater input to the treatment stage 18, using recycled treated wastewater forming a minority portion of the treated wastewater produced by the treatment stage 18, a temperature of the wastewater passing therethrough is increased so as to enhance temperature-dependent treatment processes.

The scope of the claims should not be limited by the preferred embodiments set forth in the examples but should be given the broadest interpretation consistent with the specification as a whole.

The invention claimed is:

1. A wastewater treatment plant comprising:
   an input configured for receiving wastewater for treatment;
   an output configured for discharging wastewater after treatment;
   wherein a flow of wastewater is defined by the input and the output;
   a treatment stage between the input and the output and configured for reducing contaminants in the wastewater to form treated wastewater mostly free of contaminants;
   wherein the treatment stage includes:
      a biological-process substage configured for growing unicellular organisms adapted to reduce contaminants in the wastewater which are dissolved, including at least one of organic matter and nitrogenous matter, by digestion thereof, and which are adapted to floc after digestion;
      a floc-removal substage downstream from the biological-process substage, relative to the flow of wastewater, and configured for removing the unicellular organisms that have flocked;
   wherein the treatment stage is further configured to form, downstream of the floc-removal substage, majority and minority flows of the treated wastewater respectively comprising majority and minority volumes of a common substance which is the treated wastewater;
   wherein the minority flow of the treated wastewater is configured to be recycled upstream of the biological-process substage of the treatment stage; and
   a heat transfer assembly operatively coupled to each of the majority and minority flows of the treated wastewater and configured for transferring heat from the majority flow of the treated wastewater to the minority flow of the treated wastewater to increase temperature of the minority flow of the treated wastewater for subsequently increasing temperature of wastewater to be treated upon recycling of the heated minority flow upstream of the biological-process substage;
   and wherein the heat transfer assembly comprises a first heat exchanger fluidically coupled to the majority flow of the treated wastewater, a second heat exchanger fluidically coupled to the minority flow of the treated wastewater and an intervening heat pump fluidically coupled between the first and second heat exchangers, so that heat is transferred from the majority flow of the treated wastewater to heat transfer fluid, and therefrom to the minority flow of the treated wastewater.

2. The wastewater treatment plant of claim 1 wherein the majority flow comprises between about 70% and about 95% of the treated wastewater and the minority flow comprises between about 5% and about 30% of the treated wastewater.

3. The wastewater treatment plant of claim 1 wherein the majority flow comprises between about 85% and about 90% of the treated wastewater and the minority flow comprises between about 10% and about 15% of the treated wastewater.

4. The wastewater treatment plant of claim 1 wherein the treatment stage further includes a solids-removal substage configured for reducing contaminants in the wastewater which are undissolved solids, wherein the solids-removal substage is upstream from the biological-process substage, and wherein the minority flow of the treated wastewater is recycled upstream of the solids-removal substage.

5. The wastewater treatment plant of claim 4 wherein the solids-removal substage is configured to reduce the contaminants in the wastewater which are undissolved solids by gravitational separation.

6. The wastewater treatment plant of claim 1 wherein the floc-removal substage is configured for removing the unicellular organisms that have flocked by gravitational separation.

7. A method for treating wastewater comprising:
   applying a biological process to reduce dissolved contaminants in the wastewater including at least one of organic matter and nitrogenous matter, wherein the biological process comprises growing unicellular organisms adapted to digest the dissolved contaminants;
   after applying the biological process, substantially removing the unicellular organisms from the wastewater;
   substantially removing undissolved solid contaminants from the wastewater;
   whereby treated wastewater is formed;
   forming majority and minority flows of the treated wastewater essentially consisting of majority and minority volumes thereof;

transferring heat from the majority flow to the minority flow to increase temperature of the minority flow with a heat transfer assembly comprising a first heat exchanger fluidically coupled to the majority flow of the treated wastewater, a second heat exchanger fluidically coupled to the minority flow of the treated wastewater and an intervening heat pump fluidically coupled between the first and second heat exchangers, so that heat is transferred from the majority flow of the treated wastewater to heat transfer fluid, and therefrom to the minority flow of the treated wastewater;

mixing the heated minority flow of the treated wastewater with wastewater before applying the biological process to increase temperature of wastewater for treatment; and after transferring heat from the majority flow to the minority flow, discharging the majority flow of the treated wastewater.

8. The method of claim 7 wherein removing undissolved solid contaminants from the wastewater is performed before applying the biological process, and wherein the heated minority flow of the treated wastewater is mixed with the wastewater before removing the undissolved solid contaminants.

9. The method of claim 8 wherein removing undissolved solid contaminants from the wastewater comprises gravitationally separating the undissolved solid contaminants.

10. The method of claim 7 wherein removing the unicellular organisms from the wastewater comprises gravitationally separating the unicellular organisms.

\* \* \* \* \*